United States Patent [19]
Forbert et al.

[11] Patent Number: 6,131,305
[45] Date of Patent: Oct. 17, 2000

[54] PROCESS FOR SUB-CRITICALLY DRYING AEROGELS

[75] Inventors: Rainald Forbert, Flörsheim; Andreas Zimmermann, Grieshem, both of Germany; Douglas M. Smith, Albuquerque, N. Mex.; William Ackerman, Champaign, Ill.

[73] Assignee: Hoechst Research & Technologies GmbH & Co. KG, Franklin, Germany

[21] Appl. No.: 09/142,270

[22] PCT Filed: Feb. 24, 1997

[86] PCT No.: PCT/EP97/00879

§ 371 Date: Jul. 2, 1999

§ 102(e) Date: Jul. 2, 1999

[87] PCT Pub. No.: WO97/32662

PCT Pub. Date: Sep. 12, 1997

Related U.S. Application Data

[63] Continuation of application No. 08/611,058, Mar. 5, 1996, Pat. No. 5,680,713.

[51] Int. Cl.⁷ ........................................ F26B 3/00
[52] U.S. Cl. .............................................. 34/342; 34/337
[58] Field of Search ............................ 34/329, 330, 337, 34/339, 340, 341, 342, 405, 413, 415, 78, 92

[56] References Cited

U.S. PATENT DOCUMENTS

| | | |
|---|---|---|
| 2,503,913 | 4/1950 | Kimberlin et al. ................... 34/337 |
| 4,667,417 | 5/1987 | Graser et al. ........................ 34/337 |
| 5,243,769 | 9/1993 | Wang et al. ......................... 34/470 |
| 5,473,826 | 12/1995 | Kirkbir et al. ...................... 34/405 |
| 5,680,713 | 10/1997 | Forbert et al. . |
| 5,811,031 | 9/1998 | Jansen et al. ..................... 252/315.6 |

FOREIGN PATENT DOCUMENTS

4316540 A1  11/1994  Germany .

OTHER PUBLICATIONS

PCT Application, WO 94/25149, World Intellectual Property Organization, Nov. 1994.

*Primary Examiner*—Pamela A. Wilson
*Attorney, Agent, or Firm*—Frommer Lawrence & Haug LLP

[57] ABSTRACT

The present invention relates to a process for the sub-critical drying of a lyogel to form an aerogel, in which the lyogel is treated with a heat-conveying fluid at a temperature above the boiling point of the pore liquid of the lyogel under system pressure and the dried aerogel is then separated from the heat-conveying fluid.

10 Claims, No Drawings

PROCESS FOR SUB-CRITICALLY DRYING AEROGELS

This application is a 371 of PCT/EP97/00879, filed Feb. 24, 1997, which is a continuation of U.S. application Ser. No. 08/611,058, filed Mar. 5, 1996, U.S. Pat. No. 5,680,713.

DESCRIPTION

Process for the subcritical drying of aerogels

Aerogels are highly porous low-density materials, prepared by forming a gel and subsequently eliminating the liquid with extensive preservation of the gel structure.

According to a narrow definition (see e.g. Gesser and Goswanni, Chem. Rev. 1989, 89, 767) the term aerogel is understood to refer to a material in which the liquid has been removed from the gel under supercritical conditions, whereas, when the gel is dried under subcritical conditions, the resulting product is called a xerogel, and when the liquid is eliminated from the frozen state by sublimation, the product is called a cryogel.

Aerogels within the meaning of the present invention comprise all these materials, and may also contain any other gas besides air. The gases may also be removed from the aerogel under vacuum.

Common aerogels generally contain silicon or metal oxide, and are characterized by especially low densities of 20 to 300 kg/m$^3$ with very high internal surfaces of over 500 m$^2$/g. Because of these properties, they are exceptionally suitable as heat-insulating and sound-absorbing materials, as catalyst carriers and as adsorbents.

According to the prior art, aerogels may be prepared in various ways by a sol-gel process with subsequent supercritical or subcritical drying, where the gel, before drying, may be present as a hydrogel (pore liquid is water) or as a lyogel (pore liquid is an organic solvent).

According to the prior art, all subcritical processes for the drying of lyogels to form aerogels provide the heat required for evaporation of the solvent by contact with a heated surface (contact drying), by electromagnetic waves (e.g. microwave drying) or by flow of a gas (convection drying) (see e.g. DE-A- 43 16 540). Since low densities are necessary for the application of aerogels for heat insulation, lyogels, before drying, have only very low solids levels (e.g. 6 to 8% SiO$_2$). The remaining 92 to 94% of the gel are solvent that must be evaporated. In the present case the transfer of heat for drying is difficult, since aerogels are excellent thermal insulators. Except in great energy-consuming and costly dielectric drying processes, the already dry aerogel particles inhibit the input of the heat required for drying of the wet particles so much that with conventional processes, despite high temperature gradients, only very lengthy drying courses are possible. On a commercial scale this necessarily leads to large cost-intensive dryers and poor utilization of heat.

The object of the invention was therefore to provide a process for the drying of lyogels to form aerogels that does not have the disadvantages of the known drying processes and can readily be accomplished commercially.

Surprisingly, it has now been found that heat from a liquid is transferred so well to the solvent-wetted gel particles distributed therein that the particles are protected against penetration of the surrounding heat-transfer liquid into the porous solids structure by the escaping vapor, and that, despite low temperature gradients, drying takes place in a fraction of the drying time otherwise required for aerogels.

The subject matter of the invention therefore is a process for the subcritical drying of a lyogel to form an aerogel, characterized in that the lyogel is treated with a heat-transfer liquid which has a temperature above the boiling temperature of the pore liquid of the lyogel under system pressure, and the dried aerogel is then separated from the heat-transfer liquid.

The process according to the invention allows lyogels to be dried to form aerogels in inexpensive fashion and with high utilization of heat.

In principle, all organic and inorganic lyogels which may be used as the preliminary step for an aerogel are suitable as the starting product in the known pathways of synthesis for the process according to the invention (see e.g. Jeffrey Brinker, George W. Scherer, Sol/Gel Science: The Physics and Chemistry of Sol/Gel Processing, Academic Press Ltd., London 1990; U.S. Pat. No. 5,081,163; U.S. Pat. No. 4,873,218; U.S. Pat. No. 4,997,804). Used as starting materials for example are silicon compounds, melamine formaldehyde compounds, resorcinol resins, phenolic resins, aminoplastics, urea-formaldehyde resins, as well as composite materials, consisting of one of the gels described above in combination with a commercial synthetic material, e.g. polystyrene.

Here SiO$_2$ lyogels which have been rendered hydrophobic by surface modification are preferred (see e.g. WO-A 94/25 149).

It is advantageous if, for drying, a heat-transfer liquid is selected that barely wets or does not wet the dry particles.

It is likewise advantageous if the heat-transfer liquid is not or is only partially miscible with the pore liquid, i.e., the solvent of the lyogel.

The temperature differences between the heat-transfer liquid and the boiling temperature of the pore liquid of the lyogel under system pressure is preferably at least 1° C., by particular preference at least 10C, in particular at least 30° C.

Preferably water or aqueous solutions, for example a table salt solution, are suitable as the heat-transfer liquid.

The gels to be dried are usually present in preferably commercial organic solvents, for example alcohols, preferably with 1 to 8 carbon atoms, ethers, ketones, such as acetone, esters, halogenated hydrocarbons, such as methylene chloride or chloroform, or hydrocarbons, preferably aliphatic hydrocarbons, such as hexane or heptane.

To carry out the process according to the invention, the lyogel may be introduced by, for example, a pneumatic conveyor into the heat-transfer liquid, a gas, such as air, as well as a liquid, such as heat-transfer liquid or pore liquid, preferably heat-transfer liquid, serving as the delivery medium. If the pore liquid of the lyogel has a higher density than the heat-transfer liquid, the lyogel may simply be applied to the surface of the heat-transfer liquid. There the heat-transfer liquid may be present in a bath, for example in a flotation tank or, alternatively, may be driven in forced circulation.

A preferred embodiment is characterized in that the dried aerogel, using the density difference between wet and dried material, is separated from the heat-transfer liquid, for example under gravity with a flotation device or under centrifugal force with a decanter.

A particularly preferred embodiment consists in that the aerogel, using its buoyancy in the heat-transfer liquid, is carried to the surface and is skimmed off there. For this the process preferably is carried out in a flotation tank.

The subject matter of the invention therefore is also a device for performance of the process described above containing a directly or indirectly—heatable flotation vessel, in which the heat-transfer liquid is present, and a pneumatic feed for introducing the lyogel into the heat-transfer liquid.

In an additional embodiment of the process according to the invention the lyogel is placed on, for example, a band filter, and the heat-transfer liquid is applied by, for example, spraying or splashing on by means of a washing device.

A subject of the invention therefore is also a device for performance of the process described above, containing a band filter for accommodation of the lyogel and a washing device by means of which heat-transfer liquid is applied to the lyogel.

The aerogel obtained by drying preferably is separated from the heat-transfer liquid within 2 minutes, by particular preference within 10 seconds.

The aerogels dried according to the invention are used, for example, as heat-insulating and sound-absorbing materials, as catalyst carriers and as adsorbents.

To carry out the process according to the invention, one or more features in the embodiments may be combined as desired.

The printed sources listed in the description are to be considered a component of the description by citation, and this applies particularly to the directions for the preparation of the starting lyogel.

The process according to the invention is described below in detail by means of examples.

EXAMPLE 1

An 8% by weight $SiO_2$ solution is prepared by diluting 75 mL commercially available sodium-water glass solution (Hoechst) with 224 mL deionized water. Sodium ions are removed by passing the solution through an ion exchanger resin (Rohm and Haas Amberlite). The resin is in a vertical double-jacketed column 50 cm in height and having an inside diameter of 1 cm. The double jacket of the column is temperature-controlled to 10° C. Before sol synthesis the column is washed with several volumes of deionized water. The sodium water glass solution is fed to and discharged from the column at a controlled volumetric flow rate. The water glass solution is discarded until the pH reaches the region of 2.5 to 2.9. The $SiO_2$ Sol is collected until the exchange capacity of the resin is reached. The resin is regenerated for later use by flushing with deionized water, then with 5% by weight NaOH solution, with 5% by weight HCl solution and again with deionized water, until the pH is approximately 5.

The pH of the $SiO_2$ solution is brought to 5 by the controlled addition of 1 M NaOH in order to start gelation. Before gelation, the solution is poured into cylindrical vessels. After 30 minutes the gel cylinders are removed from the vessels and placed in sealed vessels filled with water. These vessels are placed in an oven in order to age the gel for 4 hours at 80° C. After aging, the gel is cooled to room temperature.

The gel cylinders are flushed repeatedly with acetone. The acetone is then washed out of the gel in the same way with n-heptane. This is usually done in three wash steps in each instance. After the final wash step, the gel is treated with a solution of n-heptane and 1 to 10% by weight trimethyl chlorosilane (TMCS). The solution is added to the gel in a quantity such that a ratio of 8 to 50% by weight TMCS, referred to the wet gel, is obtained. The gel is allowed to stand in the solution overnight.

The heptane-wet lyogel cylinders, so rendered hydrophobic, are enclosed in a hollow body consisting of wire cloth. The hollow body is immersed in a vessel with boiling water. Contact with the water causes the heptane in the gel to heat up and evaporate rapidly. The gel particles break apart due to the internal pressure gradients in the particle which build up due to the rapid evaporation of pore liquid. Within a few seconds the fine gel rises to the surface of the water as dry material. Since the dried aerogel has less than one-tenth the density of water and is hydrophobic, it floats up to the surface of the water and can be skimmed off with a fine strainer.

The heptane in the gel pores, which is insoluble in water, rises upward in the water in small vapor bubbles and is condensed in a condenser. The dried gel is a fluffy powder and has a white, chalky appearance. The material has an apparent density of 80 kg/m$^3$ and a BET surf ace ($N_2$) of 600 m$_2$/g.

EXAMPLE 2

The gel is synthesized and treated in the same way as in Example 1, with the following exceptions: Instead of n-heptane, n-hexane is used as the second solvent; after the final wash step the gel is treated with a solution of n-hexane and 1 to 10% by weight TMCS and the TMCS-hexane solution is added to the gel in a quantity such that a ratio of 5 to 15% by weight TMCS, referred to the wet gel, is obtained.

The hexane in the gel pores, which is insoluble in water, rises upward in the water in small vapor bubbles and is condensed in a condenser. The dried gel is a fluffy powder and has a white, chalky appearance. The material has an apparent density of 85 kg/m$^3$ and a BET surface ($N_2$) of 600 m$^2$/g.

EXAMPLE 3

The gel is synthesized and treated in the same way as in Example 1, with the following exceptions: Instead of n-heptane, n-pentane is used as the second solvent; after the final wash step the gel is treated with a solution of n-pentane and 1 to 10% by weight TMCS and the TMCS-pentane solution is added to the gel in a quantity such that a ratio of 5 to 15% by weight TMCS, referred to the wet gel, is obtained.

The pentane in the gel pores, which is insoluble in water, rises upward in the water in small vapor bubbles and is condensed in a condenser. The dried gel is a fluffy powder and has a white, chalky appearance. The material has an apparent density of 83 kg/m$^3$ and a BET surface ($N_2$) of 590 m$^2$/g.

EXAMPLE 4

The gel is synthesized and treated in the same way as in Example 1, with the following exceptions: The TMCS-heptane solution is added to the gel in a quantity such that a ratio of 10% by weight TMCS, referred to the wet gel, is obtained; instead of water ethylene glycol is used as the heat-transfer liquid. The heptane-wet lyogel cylinders, rendered hydrophobic, are enclosed in a hollow body consisting of wire cloth. The hollow body is immersed in a vessel with boiling glycol. Contact with the glycol causes the heptane in the gel to heat up and evaporate rapidly. The gel particles break apart due to the internal pressure gradients in the particle which build up due to the rapid evaporation of pore liquid. Within a few seconds the fine gel rises to the surface of the glycol as dry material. Since the dried aerogel has less than one-tenth the density of water and is hydrophobic, it floats up to the surface of the glycol and can be skimmed off with a fine strainer.

The dried gel is a fluffy powder and has a white, chalky appearance. The material has an apparent density of 90 kg/m$^3$ and a BET surface (N$_2$) of 590 m$^2$/g.

EXAMPLE 5

The gel is synthesized and treated in the same way as in Example 1, with the following exceptions: The TMCS-heptane solution is added to the gel in a quantity such that a ratio of 10% by weight TMCS, referred to the wet gel, is obtained; instead of water, glycerol is used as the heat-transfer liquid. The heptane-wet lyogel cylinders, rendered hydrophobic, are enclosed in a hollow body consisting of wire cloth. The hollow body is immersed in a vessel with boiling glycerol. Contact with the glycerol causes the heptane in the gel to heat up and evaporate rapidly. The gel particles break apart due to the internal pressure gradients in the particle which build up due to the rapid evaporation of pore liquid. Within a few seconds the fine gel rises to the surface of the glycerol as dry material. Since the dried aerogel has less than one-tenth the density of glycerol and is hydrophobic, it floats up to the surface of the glycerol and can be skimmed off with a fine strainer.

The dried gel is a fluffy powder and has a white, chalky appearance. The material has an apparent density of 75 kg/m$^3$ and a BET surface (N$_2$) of 570 m$^2$/g.

We claim:

1. Process for the sub-critical drying of a lyogel to form an aerogel, characterized in that the lyogel is treated with a heat-transfer liquid having a temperature above the boiling temperature of the pore liquid of the lyogel under system pressure, and the dried aerogel is then separated from the heat-transfer liquid.

2. Process according to claim 1, characterized in that the heat transfer liquid is only partially miscible with the pore liquid of the lyogel.

3. Process according to claim 1, characterized in that the heat-transfer liquid is not partially miscible with the pore liquid of the lyogel.

4. Process according to claim 1, characterized in that, for drying, a heat-transfer liquid is selected that barely wets or does not wet the dry aerogel.

5. Process according to claim 1, characterized in that, for drying, a heat-transfer liquid is selected that does not wet the dry aerooel.

6. Process according to claim 1, characterized in that SiO$_2$ lyogels which have been rendered hydrophobic by surface modification are dried.

7. Process according to claim 1, characterized in that water is used as the heat-transfer liquid.

8. Process according to claim 1, characterized in that the dried aerogel is separated from the heat-transfer liquid by using the density difference between wet and dry material.

9. Process according to claim 1, characterized in that the aerogel, using its buoyancy in the heat-transfer liquid, is carried to the surface and is skimmed off from the surface.

10. Process according to claim 1, characterized in that the lyogel is placed on a band filter and the heat-transfer liquid is applied to the lyogel by means of a washing device.

* * * * *